United States Patent
Jeong et al.

(10) Patent No.: US 10,335,743 B2
(45) Date of Patent: Jul. 2, 2019

(54) COMPOSITE MEMBRANE, SEMI-PERMEABLE MEMBRANE INCLUDING THE COMPOSITE MEMBRANE, AND WATER TREATMENT DEVICE INCLUDING THE SEMI-PERMEABLE MEMBRANE

(71) Applicant: Samsung Electronics Co., Ltd., Suwon-si, Gyeonggi-do (KR)

(72) Inventors: Boreum Jeong, Daejeon (KR); Sung Soo Han, Hwaseong-si (KR); Soon Chul Kwon, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 426 days.

(21) Appl. No.: 15/104,845

(22) PCT Filed: Dec. 18, 2014

(86) PCT No.: PCT/KR2014/012543
§ 371 (c)(1),
(2) Date: Jun. 15, 2016

(87) PCT Pub. No.: WO2015/093876
PCT Pub. Date: Jun. 25, 2015

(65) Prior Publication Data
US 2018/0161733 A1    Jun. 14, 2018

(30) Foreign Application Priority Data

Dec. 18, 2013 (KR) .................. 10-2013-0158706

(51) Int. Cl.
*C02F 1/44* (2006.01)
*B01D 69/12* (2006.01)
(Continued)

(52) U.S. Cl.
CPC .......... *B01D 69/12* (2013.01); *B01D 69/148* (2013.01); *B01D 71/028* (2013.01); *B01D 71/30* (2013.01);
(Continued)

(58) Field of Classification Search
CPC ...... B01D 69/12; B01D 69/148; B01D 71/30; B01D 71/50; B01D 71/68; B01D 2325/022; C02F 1/442; C02F 1/444; Y02E 10/36
See application file for complete search history.

(56) References Cited

U.S. PATENT DOCUMENTS

| 4,935,139 A | 6/1990 | Davidson et al. |
| 5,376,442 A | 12/1994 | Davidson et al. |

(Continued)

FOREIGN PATENT DOCUMENTS

| JP | 2013540588 A | 11/2013 |
| KR | 1020130049616 | 5/2013 |

OTHER PUBLICATIONS

Abolfazl Jomekian et al., "Synthesis of new modified MCM-41/PSF nanocomposite membrane for improvement of water permeation flux," Desalination and Water Treatment, Mar. 29, 2012, 41:1-3, 53-61.

(Continued)

*Primary Examiner* — James C Goloboy
(74) *Attorney, Agent, or Firm* — Harness, Dickey & Pierce, P.L.C.

(57) ABSTRACT

A composite membrane including an organic polymer matrix and a plurality of porous inorganic particles is disclosed, wherein each of the porous inorganic particles has a plurality of pores arranged while forming a channel in a predetermined direction, and wherein an average length of the porous inorganic particles in a direction parallel to the (Continued)

channel is less than three times the average maximum length of the porous inorganic particles in the direction perpendicular to the channel.

19 Claims, 19 Drawing Sheets

(51) Int. Cl.

| | | |
|---|---|---|
| *B01D 69/14* | (2006.01) | |
| *B01D 71/02* | (2006.01) | |
| *B01D 71/30* | (2006.01) | |
| *B01D 71/50* | (2006.01) | |
| *B01D 71/68* | (2006.01) | |

(52) U.S. Cl.
CPC ............. *B01D 71/50* (2013.01); *B01D 71/68* (2013.01); *B01D 2325/022* (2013.01); *C02F 1/442* (2013.01); *C02F 1/444* (2013.01); *Y02E 10/36* (2013.01)

(56) References Cited

U.S. PATENT DOCUMENTS

| | | | |
|---|---|---|---|
| 5,605,628 | A | 2/1997 | Davidson et al. |
| 7,784,621 | B2 | 8/2010 | Pinnau |
| 7,946,431 | B1 | 5/2011 | Pinnau et al. |
| 8,481,110 | B2 | 7/2013 | Gu |
| 8,568,517 | B2 | 10/2013 | Nair et al. |
| 8,695,811 | B2 | 4/2014 | Kang et al. |
| 2005/0284814 | A1 | 12/2005 | Mairal et al. |
| 2006/0107830 | A1 | 5/2006 | Miller et al. |
| 2007/0022877 | A1* | 2/2007 | Marand ................ B01D 53/228 95/51 |
| 2007/0209505 | A1 | 9/2007 | Liu et al. |
| 2009/0126567 | A1* | 5/2009 | Liu ...................... B01D 53/228 95/45 |
| 2010/0056369 | A1 | 3/2010 | Gu |
| 2011/0027599 | A1 | 2/2011 | Hoek et al. |
| 2011/0100914 | A1 | 5/2011 | Mairal et al. |
| 2012/0108418 | A1 | 5/2012 | Nair et al. |
| 2013/0112613 | A1 | 5/2013 | Kang et al. |
| 2014/0048477 | A1 | 2/2014 | Kang et al. |

OTHER PUBLICATIONS

Chanjuan Liao et al., "Synethsis and characterization of SBA-15/ poly (vinylidene fluoride) (PVDF) hybrid membrane," College of Chemistry and Molecular Sciences, Desalination, May 26, 2010, 260, 147-152.

A. Jomekian et al., "Synthesis and characterization of novel PEO-MCM-41/PVDC nanocomposite membrane," Department of Chemical Engineering, Desalination, Apr. 8, 2011, 276, 239-245.

Huiqing Wu et al., "Novel Hollow Mesoporous Silica Spheres/ Polymer Hybrid Membrane for Ultrafiltration," The Journal of Physical Chemistry, Dec. 21, 2011, 2246-2252.

Jian Huang et al., "Fabrication of polyethersulfone-mesoporous silica nanocomposite ultrafiltration membranes with antifouling properties," Journal of Membrane Science, Aug. 2012, 423-424, 362-370.

Roland Marschall et al., "Proton-Conducting Composite Membranes for Future Perspective Applications in Fuel Cells, Desalination Facilities and Photocatalysts," Chemie Ingenieur Technik, Protonenleitung, Oct. 11, 2011, 83, 2177-2187.

Chalida Klaysom et al., "Synthesis of composite ion-exchange membranes and their electrochemical properties for desalination applications," ARC Centre of Excellence for Functional Nanomaterials, Journal of Materials Chemistry, The Royal Society of Chemistry, Apr. 26, 2010, 20, 4669-4674.

International Search Report PCT/ISA/210 for International Application No. PCT/KR2014/012543 dated Dec. 18, 2014.

Written Opinion of the International Searching Authority PCT/ISA/237 for International Application No. PCT/KR2014/012543 dated Dec. 18, 2014.

\* cited by examiner

COMPOSITE MEMBRANE, SEMI-PERMEABLE MEMBRANE INCLUDING THE COMPOSITE MEMBRANE, AND WATER TREATMENT DEVICE INCLUDING THE SEMI-PERMEABLE MEMBRANE

CROSS REFERENCE TO RELATED APPLICATION

This is a National Phase Application of PCT/KR2014/012543, filed Dec. 18, 2014, is an International Application which designated the United States of America, and which claims priority to and the benefit of Korean Patent Application No. 10-2013-0158706 filed in the Korean Intellectual Property Office on Dec. 18, 2013, the entire contents of each of which are incorporated herein by reference.

BACKGROUND

1. Field

A composite membrane, a semi-permeable separation membrane including the composite membrane, and a water treatment device including the separation membrane are disclosed.

2. Description of the Related Art

In general, a semi-permeable membrane is known to be widely used among various processes of treating a solution including various materials to exclude subject materials to be removed (e.g., salts).

Particularly, a semi-permeable membrane having high performance is required to obtain water having desired quality (e.g., drinking water, ultra-pure water) by removing salts and organic materials from the water including the salts and organic materials in a high concentration such as sea water. For example, the semi-permeable membrane may be said to have higher performance as the water permeability is higher and the salt transmittance is lower.

Generally, the structure of a semi-permeable membrane may be basically classified into a separation layer and a support layer.

The separation layer mainly acts to remove salts, and the support layer acts to support a separation layer against the water pressure including driving under a high pressure condition. Generally, since impurities are selectively separated and transmitted through a separation layer, the salt transmittance may depend upon the physical properties and structure of the separation layer. As the produced water or the inflow water is passed through the support layer, both the physical properties and structures of the separation layer and the support layer may simultaneously influence the water permeability. Among them, the physical property and structure of the support layer may have a greater influence on the water permeability than the separation layer.

The water permeability refers to how much water is transmitted through a unit area of membrane per a unit time, and a faster water passing speed is required to improve the water permeability. As the produced water or the inflow water is passed through the support layer, the support layer may act as a resistance while the water is passing. Accordingly, ideally, the support layer is required to have a low level of structural resistance.

In addition, in order to increase the hydrophilicity, the material for a support layer may have high hydrophilicity.

One of the most common methods of manufacturing a water treatment membrane is to employ non-solvent induced phase separation (NIPS), but in this case, it has limits to satisfying these two requirements.

According to the method using NIPS, a phase is separated by the miscibility difference of polymer/solvent/non-solvent to provide a pore. However, in the method, the forming of pores is determined by the diffusion speed of a solvent/non-solvent, so the pore control is not easy. In addition, as water is generally used as a non-solvent in the NIPS method, the material for a membrane may be neither dissolved nor swelled in water.

Because of this, in order to provide low structural resistance and hydrophilicity to the support layer, a material having the corresponding characteristics is needed. In order to decrease the structural resistance, the representative material having a cylindrical channel such as CNTs (carbon nanotubes) has been induced, but the hydrophobicity of CNT is a drawback. In order to provide the hydrophilicity, although titania, silica nanoparticles, or the like is introduced as inorganic particles having strong hydrophilicity, these are non-porous materials which provide high structural resistance, so they have limits in improvement of water permeability.

SUMMARY

One embodiment provides a composite membrane having high hydrophilicity and low structural resistance.

Another embodiment provides a semi-permeable separation membrane including the composite membrane.

Yet another embodiment provides a water treatment device including the semi-permeable separation membrane.

According to one embodiment, a composite membrane including an organic polymer matrix and a plurality of porous inorganic particles is provided, wherein each of the porous inorganic particles has a plurality of pores arranged while forming a channel in a predetermined direction, and wherein an average length of the porous inorganic particles in a direction parallel to the channel is less than three times an average maximum length of the porous inorganic particles in a direction perpendicular to the channel.

The plurality of porous inorganic particles may include porous inorganic particles disposed and arranged in a range of about −45° to about 45° relative to the direction perpendicular to the surface of the composite membrane in the organic polymer matrix.

The plurality of porous inorganic particles may have a pore size of about 1 nanometer to about 50 nanometers.

The porous inorganic particles may have an average length of about 50 nanometers to about 3 micrometers in the direction parallel to the channel.

The porous inorganic particles may have an average length of about 50 nanometers to about 600 nanometers in the direction parallel to the channel.

The plurality of porous inorganic particles may be silica-containing particles.

The plurality of porous inorganic particles may include MCM-42, SBA-3, SBA-15, SBA-16, MCM-48, MCM-50, SBA-1, or a combination thereof.

The organic polymer matrix may include a polysulfone-based polymer selected from: polysulfone, polyethersulfone, and poly(ether sulfone ketone); a poly(meth)acrylonitrile polymer selected from polyacrylonitrile and polymethacrylonitrile; a polyolefin-based polymer selected from polyethylene, polypropylene, and polystyrene; a polycarbonate; a polyalkylene terephthalate selected from polyethylene terephthalate and polybutylene terephthalate; a polyimide-based polymer; a polybenzimidazole-based polymer; a polybenzothiazole-based polymer; a polybenzoxazole-based polymer; a polyepoxy-based polymer; a polyphenylenevinylene-based polymer; a polyamide-based polymer; a cellulose-based polymer; polyvinylidene fluoride (PVDF); polytetrafluoroethylene (PTFE); polyvinylchloride (PVC); or a combination thereof.

The plurality of porous inorganic particles may be included in amount of about 0.5 wt % to about 10 wt % based on the total weight of the composite membrane.

According to another embodiment, a semi-permeable separation membrane including the composite membrane and a separation layer is provided.

The separation layer may include a polyamide, a cross-linked polyamide, a polyamide-hydrazide, a poly(amide-imide), a polyimide, poly(allylamine)hydrochloride/poly(sodium styrene sulfonate) (PAH/PSS), polybenzimidazole, a sulfonated poly(arylene ether sulfone), or a combination thereof.

The composite membrane may have a thickness of about 25 to about 250 micrometers.

The separation layer may have a thickness of about 0.01 to about 100 micrometers.

The semi-permeable separation membrane may be a microfiltration membrane, an ultrafiltration membrane, or a nanofiltration membrane.

According to yet another embodiment, a water treatment device including the semi-permeable separation membrane is provided.

DETAILED DESCRIPTION

Figure 1:
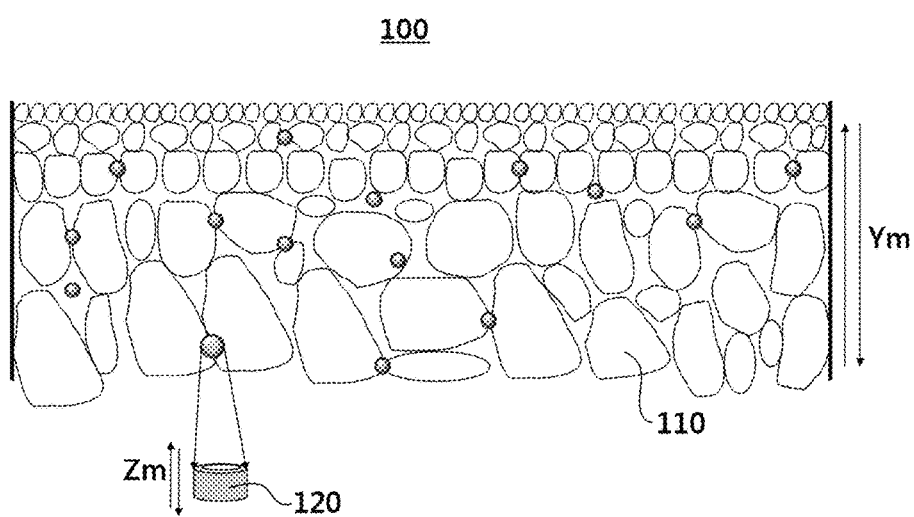
FIG. 1 is a cross-sectional view of a composite membrane according to one embodiment.

This disclosure will be described more fully hereinafter in the following detailed description, in which some but not all embodiments of this disclosure are described. However, this disclosure may be embodied in many different forms and is not construed as limited to the exemplary embodiments set forth herein.

For clear explanation of the present invention, parts unrelated to the present disclosure are omitted, and the same reference numbers are assigned for the same or similar constituent elements.

The size and thickness of each constituent element as shown in the drawings are randomly indicated for better understanding and ease of description, and this disclosure is not necessarily limited to as shown.

The size and thickness of each constituent element as shown in the drawings are randomly indicated for better understanding and ease of description, and this disclosure is not necessarily limited to as shown.

In the drawings, the thickness of layers, films, panels, regions, etc., are exaggerated for clarity. In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a composite membrane according to one embodiment is described referring to FIG. 1.

FIG. 1 is a cross-sectional view of a composite membrane according to one embodiment.

Referring to FIG. 1, the composite membrane 100 includes an organic polymer matrix 110, and a plurality of porous inorganic particles 120.

The porous inorganic particle has a plurality of pores arranged in a predetermined direction. The arranged pores may define the water-passing channel in the composite membrane 100. The structure of the porous inorganic particle is explained with reference to FIG. 2.

Figure 2:
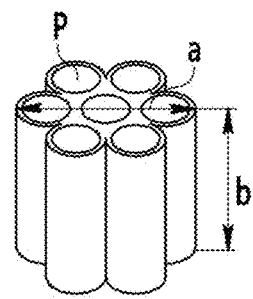
FIG. 2 is a cross-sectional view showing a structure of a porous inorganic particle in a composite membrane according to one embodiment.

FIG. 2 is a cross-sectional view showing a structure of a porous inorganic particle in a composite membrane according to one embodiment. As shown in FIG. 2, although a plurality of pores (P) form a cylindrical channel, this is only exemplified, and the pore shape is not limited as long as they form a channel transmitting water.

According to one embodiment, the porous inorganic particles may have an average length in the direction parallel to the channel of less than 3 times the average maximum length in the direction perpendicular of the channel of the porous inorganic particles. As shown in FIG. 2, when the porous inorganic particle has a cylindrical pore, the terms "length of the porous inorganic particle in the parallel direction to the channel" indicates a height (b) of the cylinder, and the term "maximum length of the porous inorganic particle in the direction perpendicular to the channel" indicates a maximum diameter (a) of the surface where the cylinders are gathered. In the specification, the term "average" refers to an arithmetic mean.

As described above, the average length of the porous inorganic particles in the direction parallel to the channel is less than about 3 times the average maximum length of the porous inorganic particles in the direction perpendicular to the channel. In other words, the porous inorganic particles have an average aspect ratio of less than about 3. The "aspect ratio" in the specification is defined as follows, and the "average aspect ratio" refers to an arithmetic mean of the aspect ratio.

Aspect ratio=(length of porous inorganic particle in direction parallel to channel)/(maximum length of porous inorganic particle in direction perpendicular to channel).

Referring to FIG. 1 again, when the porous inorganic particles 120 have an average length in the direction parallel to the channel (i.e., channel direction (Zm)) of less than about 3 times the average maximum length of the porous inorganic particles 120 in the direction perpendicular to the channel, the transmission rate may be increased. Without being bound by any particular theory, this is understood to be because a plurality of porous inorganic particles 120 have a significantly higher possibility that the direction parallel to the channel will be arranged to be similar to or the same as the direction (Ym) perpendicular to the surface of the composite membrane, in the composite membrane according to one embodiment. Accordingly, when water is passed through the composite membrane 100, the channel direction (Zm) of a plurality of porous inorganic particles 120 may be more similar to the water flowing direction. Like this, the arrangement of porous inorganic particles 120 may be controlled by adjusting the aspect ratio of the porous inorganic particles 120 in the composite membrane 100. Thereby, the water permeability of composite membrane is adjusted to control flux of water passing through the pore. In this regards, the average channel of the porous inorganic particles in the direction parallel to the channel may be less than about 2.5 times, less than about 2 times, less than about 1.5 times, or less than about 1 time the average maximum length of the porous inorganic particles in the direction perpendicular to the channel, but is not limited thereto.

The plurality of arranged pores may form a water-transmitting channel.

For example, greater than or equal to about 50% of the plurality of porous inorganic particles may be disposed and arranged in a range of about −45° to about 45° relative to the direction perpendicular to the surface of composite membrane in the organic polymer matrix. The plurality of porous inorganic particles may minimize the resistance in the water transmission path by being arranged in this way in the organic polymer matrix. The principal is explained with reference to FIG. 3.

Figure 3:
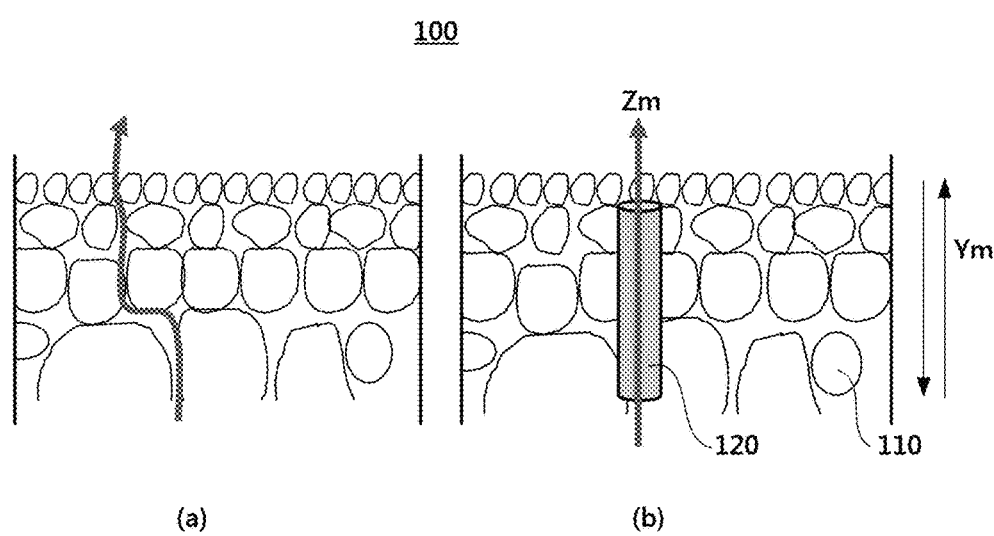
FIG. 3 schematically shows the reason why the permeation efficiency is improved in the composite membrane including the porous inorganic particle according to one embodiment.

FIG. 3 is a view showing the principle that the permeation efficiency of the composite membrane is improved by including the porous inorganic particles. Referring to FIG. 3, the composite membrane (a) including no porous inorganic particles in the organic polymer matrix 110 increases the water transporting path. However, the composite membrane (b) including the porous inorganic particles 120 according to one embodiment may shorten the water transporting path since the particle pores may be used as water flowing channels. That is, the composite membrane (b) decreases the tortuosity. The composite membrane may be used as a support layer for a water treatment membrane, and in this case, the tortuosity may act as resistance of a water transporting path. The composite membrane according to one embodiment minimizes the tortuosity, that is, the water transporting path is shortened, so the water permeability may be improved.

Figure 4:
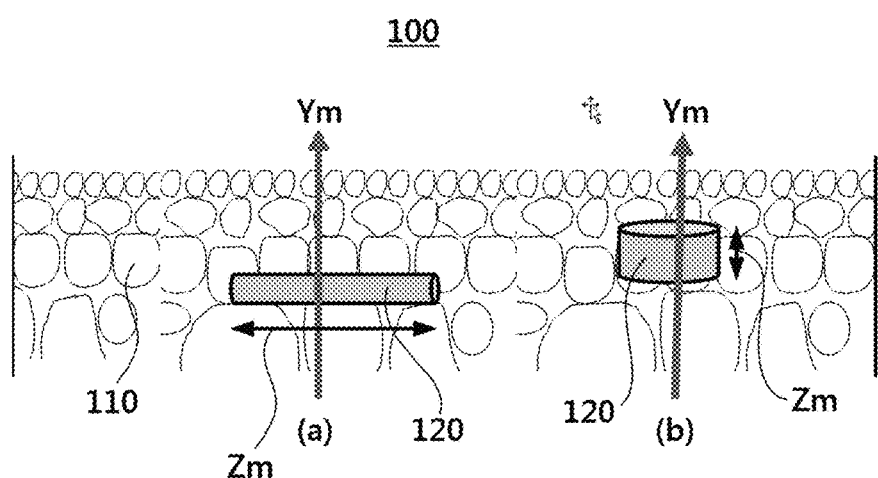
FIG. 4 is a cross-sectional view showing how the porous inorganic particles are arranged in the organic polymer matrix.

The arrangement direction of the porous inorganic particle 120 is represented by the angle between the direction (Ym) perpendicular to the surface of composite membrane 100 and the channel direction (Zm) of the porous inorganic particle 120. The arrangement direction of the porous inorganic particle 120 is further explained with reference to FIG. 4. FIG. 4 is a cross-sectional view of the composite membrane 100 for describing the direction in which the porous inorganic particle 120 is arranged in the organic polymer matrix 110.

When the angle between the direction (Ym) perpendicular to the surface of the composite membrane 100 and the channel direction (Zm) of porous inorganic particle 120 is 90° as in FIG. 4 (a), the arrangement direction of the porous inorganic particle 120 refers to 90° or −90°.

As in FIG. 4 (b), when the angle between the direction (Ym) perpendicular to the surface of the composite membrane 100 and the channel direction (Zm) of the porous inorganic particle 120 is 0°, the arrangement direction of the porous inorganic particle 120 refers to 0°.

Referring to FIG. 1 again, greater than or equal to about 50% of the total number of the plurality of porous inorganic particles may be present within the range of −45° to about 45° relative to the direction (Ym) perpendicular to the surface of the composite membrane. In other words, greater than or equal to about 50% of the total number of the plurality of porous inorganic particles 120 may have the arrangement direction of about −45° and about 45°, which is between the channel direction (Zm) and the direction (Ym) perpendicular to the surface of composite membrane 100 in the organic polymer matrix 110.

If arranged within the range, there may be less of an effect of the resistance caused between the porous inorganic particle 120 and the transmitted water while transporting water. Thereby, the water permeability of the composite membrane 100 may be improved. In this regard, greater than or equal to about 50% of the total number of porous inorganic particles 120 may be arranged within the range, for example, from about −40° to about 40°, the range from about −35° to about 35°, or the range from about −30° to about 30° relative to the direction (Ym) perpendicular to the surface of the composite membrane 100 in the organic polymer matrix 110, but this is only exemplified and not limiting.

The plurality of porous inorganic particles may be mesoporous particles.

The mesoporous material may be synthesized according to a hydrothermal reaction by using a surfactant or an organic material such as an amphiphilic polymer as a structure draw material. As the surfactant or the amphiphilic polymer may include a hydrophilic head part and a hydrophobic tail part, it may form a micelle or a liquid crystal structure having various structures through the self-assembly phenomenon in the aqueous solution. When an obtained supramolecule having the various structures is used as a template, the porous material in which a plurality of desirably-shaped pores are arranged, for example, regularly, may be synthesized.

For example, the size (diameter) of mesopores may range from about 1 nanometer to about 50 nanometers, for example, from about 2 nanometers to about 30 nanometers.

The plurality of porous inorganic particles may be hydrophilic particles. The inorganic component is not particularly limited as long as it has hydrophilicity, and may contain, for example, silica. The silica-containing mesoporous particle may include, for example MCM-42, SBA-3, SBA-15, SBA-16, MCM-48, MCM-50, SBA-1, or a combination thereof. The aspect ratio of the particle may be selected by adjusting the ratio of a hydrophilic group and hydrophobic group of a surfactant, for example, during the particle synthesizing process. The surfactant may have a mole ratio of hydrophilic group and hydrophobic group of, for example, about 0.35:0.65 to about 0.5:0.5, or for example about 0.35:0.65 to about 0.4:0.6. If included within the ratio range, the pores of the mesoporous particles may be arranged in the fluid transmitting direction or a direction near the same.

For example, the porous inorganic particles may have an average length of about 50 nanometers to about 3 micrometers in the direction parallel to the channel, for example, about 50 nanometers to about 600 nanometers, which is only exemplary and is not limiting.

The organic polymer matrix 110 may include, for example, a polymer selected from a polysulfone-based polymer selected from polysulfone, polyethersulfone, poly(ether sulfone ketone), and the like; a poly(meth)acrylonitrile polymer selected from polyacrylonitrile, polymethacrylonitrile, and the like; a polyolefin-based polymer selected from polyethylene, polypropylene, polystyrene, and the like; a polycarbonate; a polyalkylene terephthalate selected from polyethylene terephthalate, polybutylene terephthalate, and the like; a polyimide-based polymer; a polybenzimidazole-based polymer; a polybenzothiazole-based polymer; a polybenzoxazole-based polymer; a polyepoxy-based polymer; a polyphenylenevinylene-based polymer; a polyamide-based polymer; a cellulose-based polymer; polyvinylidene fluoride (PVDF); polytetrafluoroethylene (PTFE); polyvinylchloride (PVC); and a combination thereof, but is not limited thereto.

On the other hand, a plurality of porous inorganic particles 120 may be included, for example, in the range from about 0.1 wt % to about 15 wt %, for example from about 0.5 wt % to about 10 wt %, based on the total weight of the composite membrane 100.

Hereinafter, the semi-permeable separation membrane according to another embodiment is described with reference to FIG. 5.

Figure 5:
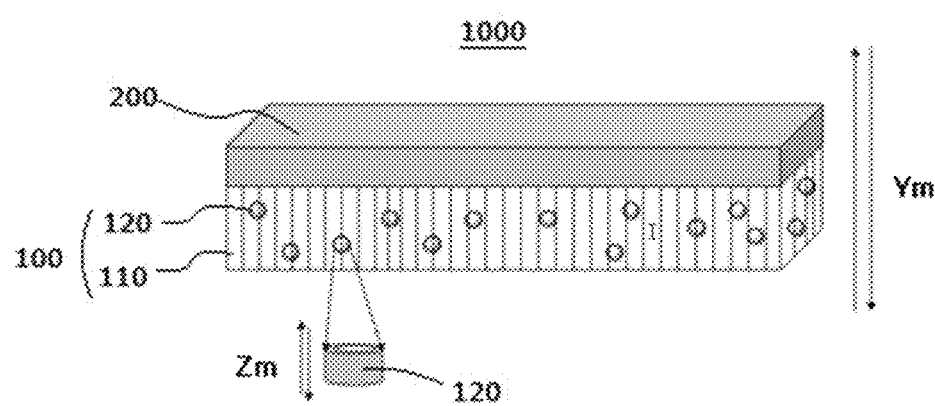
FIG. 5 is a schematic view showing the cross-sectional structure of semi-permeable separation membrane according to another embodiment.

FIG. 5 is a cross-sectional view showing a semi-permeable separation membrane according to another embodiment.

Referring to FIG. 5, the semi-permeable separation membrane 1000 includes a composite membrane 100 and a separation layer 200. The detailed description of the composite membrane 100 is the same as above, so it is omitted.

The separation layer 200 may be formed on at least one surface of the composite membrane 100.

The separation layer 200 plays a role of an active layer for a separation property of the semi-permeable separation membrane 1000, and the composite membrane 100 may act as a support layer for supporting the separation layer 200.

The separation layer 200 may be permeable for water and nonpermeable for a separating subject material such as a contamination material.

The separation layer 200 may include, for example, a polymer selected from a polyamide, a cross-linked polyamide, a polyamide-hydrazide, a poly(amide-imide), a polyimide, poly(allylamine)hydrochloride/poly(sodium styrene sulfonate) (PAH/PSS), polybenzimidazole, a sulfonated poly(arylene ether sulfone), and a combination thereof, but is not limited thereto.

As the semi-permeable separation membrane 1000 is prepared as a composite membrane including the separation layer 200, the rejection rate may be improved compared to the case of using the composite membrane 100 alone. The semi-permeable separation membrane 1000 may be a composite membrane in which the composite membrane 100 and the separation layer 200 are formed of heterogeneous materials. For example, the semi-permeable separation membrane 1000 may include polysulfone (PS) as a component for a porous composite membrane 100 and polyamide (PA) as a component for a separation layer 200.

The porous composite membrane 100 may have a thickness of, for example, about 25 micrometers to about 250 micrometers. If satisfying the range, the water flux may be maintained, and simultaneously, the separation membrane may have appropriate strength.

The separation layer 200 may have a thickness of, for example, about 0.01 to about 100 micrometers. If satisfying the range, the water permeability of the semi-permeable separation membrane and the salt rejection rate may be simultaneously ensured.

The semi-permeable separation membrane 1000 may include very tiny pores in the region where the porous composite membrane 100 and the separation layer 200 are contacted.

The composite membrane includes mesoporous particles of a hydrophilic material, and may maximize the quantity of material passing through the mesopores, particularly by arranging the mesoporous particles in a predetermined direction in the porous support layer. Accordingly, the semi-permeable separation membrane including the composite membrane may maximize the water permeability, so as to ultimately improve the water treatment efficiency.

The semi-permeable separation membrane may be a reverse osmotic membrane or a forward osmotic membrane. In addition, the semi-permeable separation membrane may be used as a microfiltration membrane, an ultrafiltration membrane, or a nanofiltration membrane depending upon the application. According to a size of the subject particle to be separated, the kind of separation membrane may be selected. The method of manufacturing the separation membrane is not limited and may include any known method.

The semi-permeable separation membrane may be applied to, for example, osmotic power generation using a salinity difference, as well as a water treatment field such as water purification, wastewater treatment and reuse, and desalination of sea water. The separation membrane may be applied to all modes of water treatment including, for example, a forward osmosis mode, a reverse osmosis mode, or the like.

Hereinafter, a method of manufacturing the composite membrane is described.

According to another embodiment, a method of manufacturing an organic/inorganic composite membrane includes: preparing a polymer solution including a plurality of mesoporous particles; coating the polymer solution on a substrate; and precipitating the substrate coated with the polymer solution in a non-solvent to provide a composite membrane.

For example, the mesoporous particle may be synthesized according to a hydrothermal reaction by using a surfactant of an amphiphilic polymer as a structure draw material. The amphiphilic polymer includes a hydrophilic head part and a hydrophobic tail part, so it is well known to form a variety of micelle or liquid crystal structures through a self-assembly phenomenon in an aqueous solution. When obtained supramolecules having various shapes are used as a template, the desirably-shaped mesoporous material may be synthesized.

The method of manufacturing a composite membrane includes preparing a polymer solution including a plurality of mesoporous particles. The plurality of mesoporous particles are prepared to provide an average aspect ratio with less than about 3. By controlling the average aspect ratio within the range, an angle between the channel direction of particles and the direction perpendicular to the surface of the composite membrane may be further decreased. Thereby, the tortuosity in the material transmitting path is decreased, so ultimately the permeation efficiency may be improved.

The mesoporous particle may include a particle such as MCM-42, SBA-3, SBA-15, SBA-16, MCM-48, MCM-50, SBA-1, or a combination thereof, but is not limited thereto.

For example, the average aspect ratio of mesoporous particles may be controlled by adjusting the ratio of a hydrophilic group and a hydrophobic group of the draw material such as a surfactant.

The kind of surfactant is not limited as long as it is an amphiphilic polymer having both a hydrophilic group and a hydrophobic group. The amphiphilic polymer may include, for example, Pluronic®, CTAB (cetyltrimethylammonium bromide), or a combination thereof, but is not limited thereto.

The Pluronic® is a PE-PP-PE block copolymer, and the example thereof may include L35, F38, L42, L43, L44, L62, L63, L64, P65, F68, L72, P75, F77, P84, P85, F87, F88, F98, P103, P104, P105, F108, L122, P123, or F127. The polymer solution may include a polymer component for a matrix of the composite membrane besides the mesoporous particles. The specific examples of organic polymer for a composite membrane matrix are the same as described above.

The polymer solution may include an organic solvent dissolving the polymer component.

The polymer solution may further include a pore-forming agent. The pore-forming agent may include polyvinylpyrrolidone, polyethylene glycol, polyethyloxazoline, glycerol, ethylene glycol, diethylene glycol, ethanol, methanol, acetone, phosphoric acid, acetic acid, propanoic acid, lithium chloride, lithium nitrate, lithium perchlorate, or a combination thereof, but is not limited thereto.

For example, the mesoporous particle may be included within the range from about 0.5 wt % to about 10 wt % based on the entire polymer solution, and the pore-forming agent may be included at about 0 to about 10 wt % based on the entire polymer solution, but are not limited thereto.

The polymer solution is casted on the substrate in a thickness of about 25 to about 250 micrometers, but is not limited thereto, and the thickness may be appropriately selected considering the components of the polymer solution and the usage of separation membrane.

The obtained composite membrane may have an angle average between the channel direction of the plurality of particles and the direction perpendicular to the composite membrane surface within a range of about −45° to about 45°.

Hereinafter, the embodiments are illustrated in more detail with reference to examples. However, the following examples merely exemplify specific embodiments but do not limit the present invention.

EXAMPLE 1

Preparation of Porous Inorganic Particle 20 mL of tetraethyl orthosilicate is mixed into a hydrochloric acid mixed solution including 60 mL of hydrochloric acid at 40° C. Surfactants P123 and F127 are added thereto to provide a mole ratio of a hydrophilic group and a hydrophobic group of 40:60, and maintained at 40° C. and agitated for 40 hours. The formed particles are filtered and then baked at 550° C. for 5 hours to provide porous inorganic particles.

The sample of porous inorganic particles is prepared, 10 particles observed in a SEM photograph (magnification 20,000) of the sample are randomly chosen, and each particle is measured for length in the direction parallel to a channel and a maximum length in the direction perpendicular to the channel. Then each value is arithmetically averaged and respectively determined as an "average length in the direction parallel to the channel" and an "average maximum length in the direction perpendicular to the channel."

Figure 6:
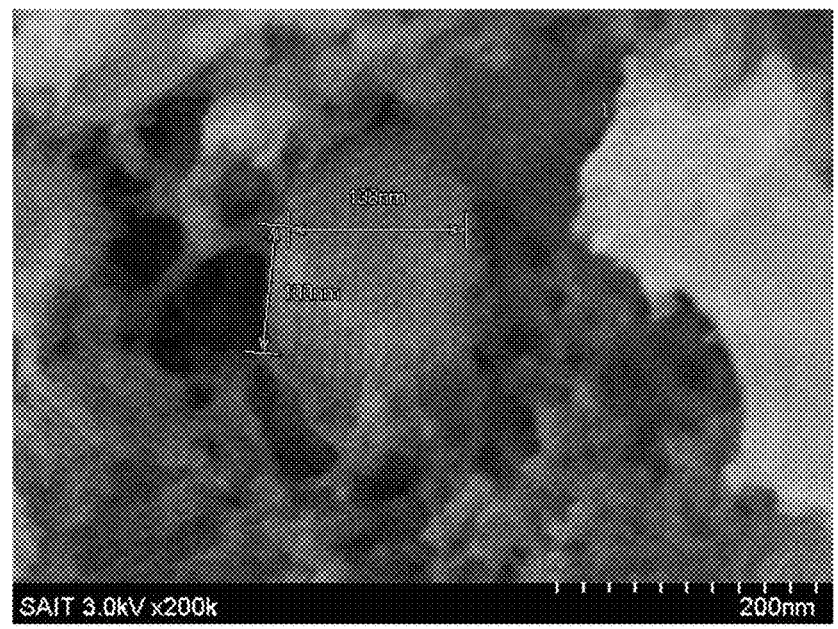
FIG. 6 is a SEM photograph showing a porous inorganic particle according to Example 1.
Figure 7:
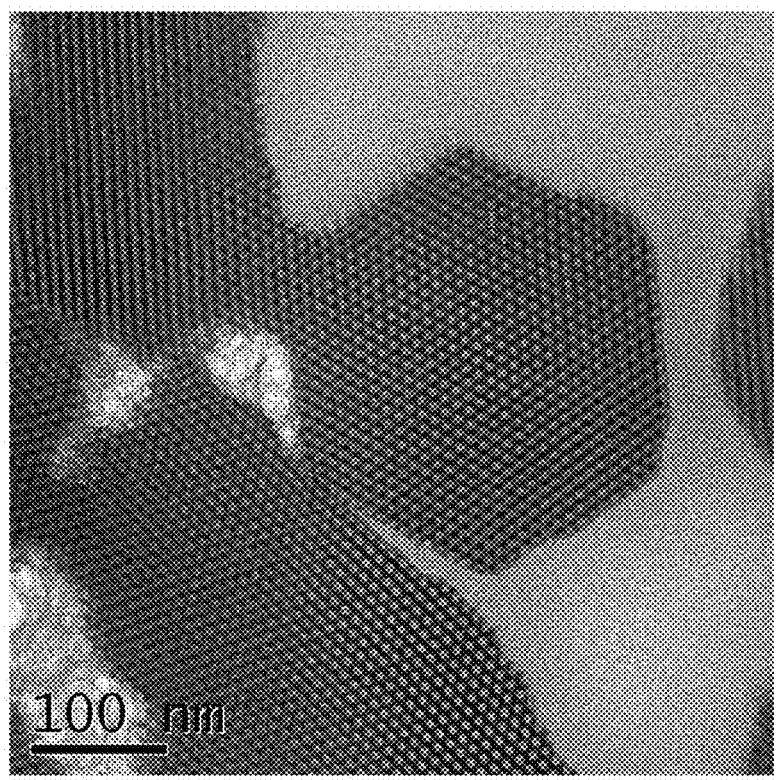
FIGS. 7 to 9 are TEM photographs showing a porous inorganic particle according to Example 1.
Figure 8:
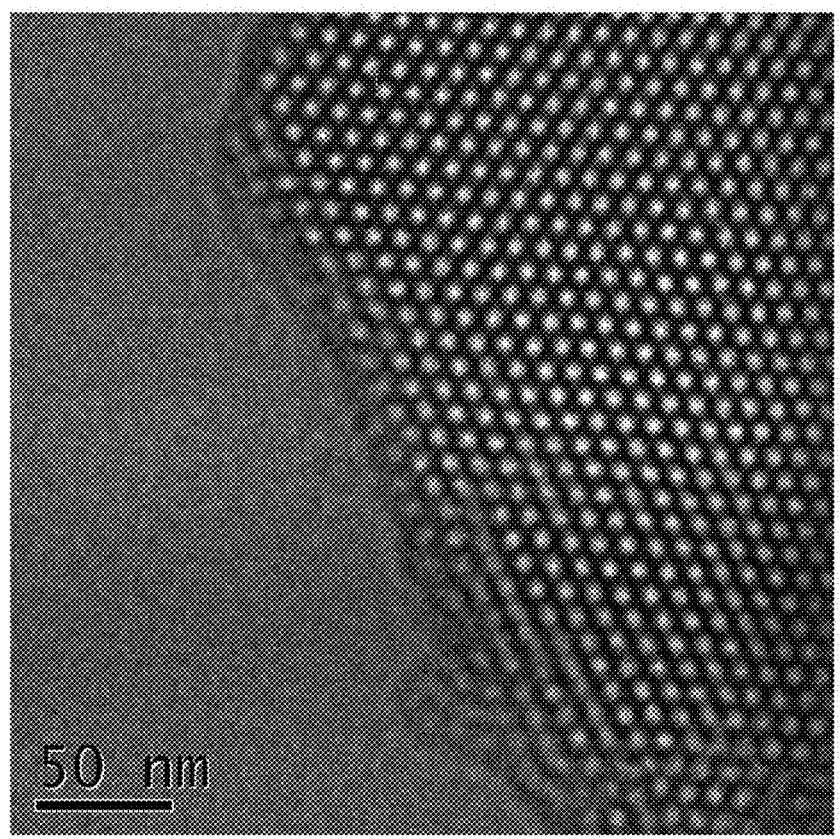
Figure 9:
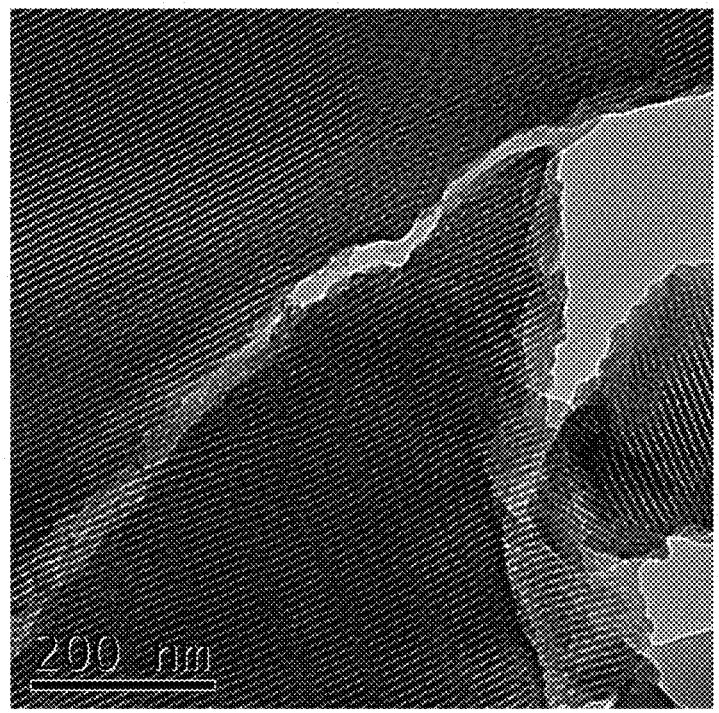

FIG. 6 is a SEM photograph showing an aspect ratio of porous inorganic particles obtained from Example 1, and FIGS. 7 to 9 are TEM photographs of the porous inorganic particles obtained from Example 1.

Referring to FIG. 6, it is understood that an obtained particle has a length of about 100 nanometers in the direction parallel to the channel and a maximum length of about 138 nanometers in the direction perpendicular to the channel, so the length in the direction parallel to the channel is less than the maximum length in the direction perpendicular to the channel (aspect ratio: about 0.77).

EXAMPLE 2

Manufacture of Composite Membrane 13 g of polysulfone, 87 g of N-dimethylformamide, and 5 g of the porous inorganic particles obtained from Example 1 are mixed to provide a polymer solution.

Subsequently, the polymer solution is casted on a polyester non-woven fabric in a thickness of 150 μm, and then the phase is inverted in deionized water at 25° C. to provide a composite membrane.

COMPARATIVE EXAMPLE 1

13 g of polysulfone and 87 g of N-dimethylformamide are mixed to provide a polymer solution. Subsequently, the polymer solution is casted on a polyester non-woven fabric in a thickness of 150 μm, and the phase is inverted in deionized water at 25° C. to provide a membrane.

COMPARATIVE EXAMPLE 2

13 g of polysulfone, 87 g of N-dimethylformamide, and 5 g of non-porous silica (silica fumed powder; 0.2-0.3 μm, Aldrich) are mixed to provide a polymer solution. Subsequently, the polymer solution is casted on a polyester non-woven fabric in a thickness of 150 μm, and the phase is inverted in deionized water at 25° C. to provide a membrane.

COMPARATIVE EXAMPLE 3

20 mL of tetraethyl orthosilicate is mixed with a hydrochloric acid mixed solution including 60 mL of hydrochloric acid at 40° C. Surfactants P123 and F127 are added thereto to provide a mole ratio of a hydrophilic group and a hydrophobic group of 30:70 and agitated for 40 hours while maintaining it at 40° C. The formed particles are filtered and baked at 550° C. for 5 hours to provide porous inorganic particles.

13 g of polysulfone, 87 g of N-dimethylformamide, and 5 g of the porous inorganic particles are mixed to provide a polymer solution. Subsequently, the polymer solution is casted on a polyester non-woven fabric in a thickness of 150 μm, and the phase is inverted in deionized water at 25° C. to provide a membrane.

Reference Example

The aspect ratio change of mesoporous particles according to changing the ratio of a hydrophilic group and a hydrophobic group of the surfactant is shown in the following Table 1.

In the following Table 1, Nos. 1 to 5 each indicate a particle size of mesoporous particles obtained under the same conditions excepting the mole ratio of the hydrophilic group and the hydrophobic group of the surfactant.

TABLE 1

| No. | Hydrophilic group:hydrophobic group (mole ratio) | Longest length in a direction perpendicular to channel (μm) | Length in a direction parallel to channel (μm) | Aspect ratio |
|---|---|---|---|---|
| 1 | 30:70 | 0.9 | 40 | 44.44 |
| 2 | 35:65 | 0.18 | 0.64 | 3.56 |
| 3 | 37:63 | 0.18 | 0.48 | 2.67 |
| 4 | 39:61 | 0.13 | 0.29 | 2.23 |
| 5 | 41:59 | 0.13 | 0.1 | 0.77 |

As shown in Table 1, it is understood that the aspect ratio of the obtained mesoporous particles is decreased as the hydrophilic group fraction of the surfactant is increased.

Evaluation 1: Observation of Surface/Cross-section of Composite Membrane

The surface or the cross-section of each membrane obtained from Example 2 and Comparative Examples 1 to 3 is observed through a SEM photograph and a TEM photograph. The results are shown in FIGS. 10 to 18.

Figure 10:
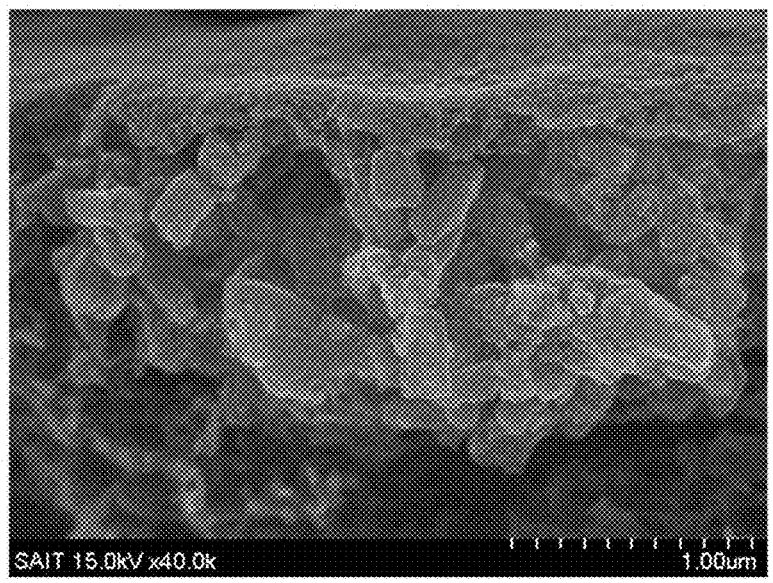
FIGS. 10 to 12 are SEM photographs showing a cross-section of a composite membrane according to Example 2.
Figure 11:
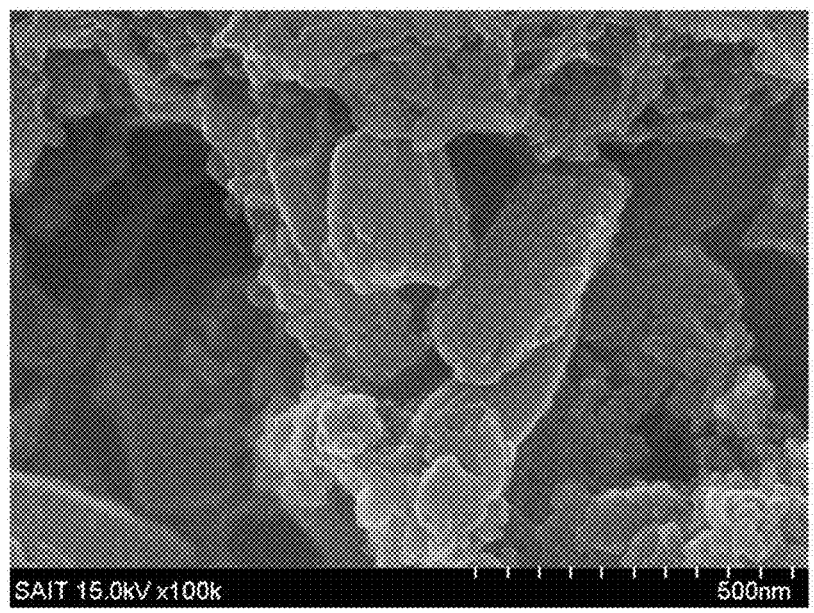
Figure 12:
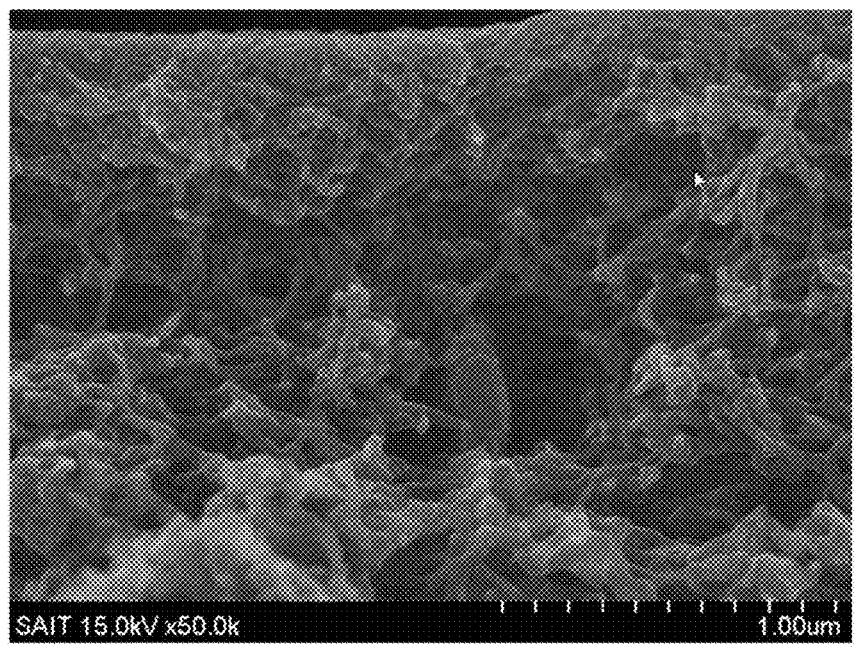
Figure 13:
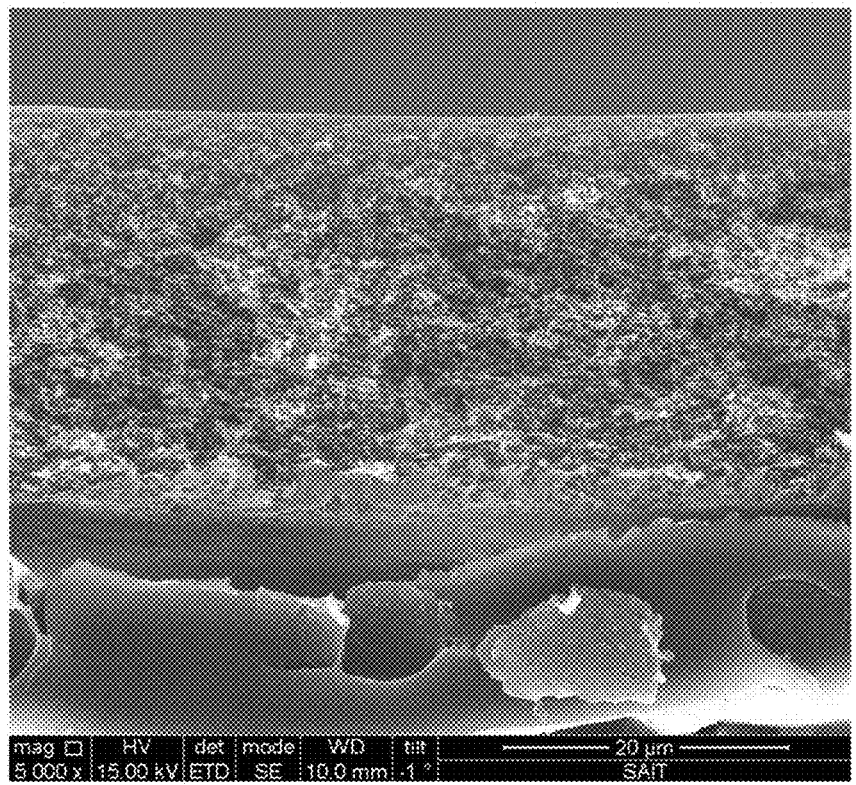
FIG. 13 is a SEM photograph showing a cross-section of a membrane according to Comparative Example 1.
Figure 14:
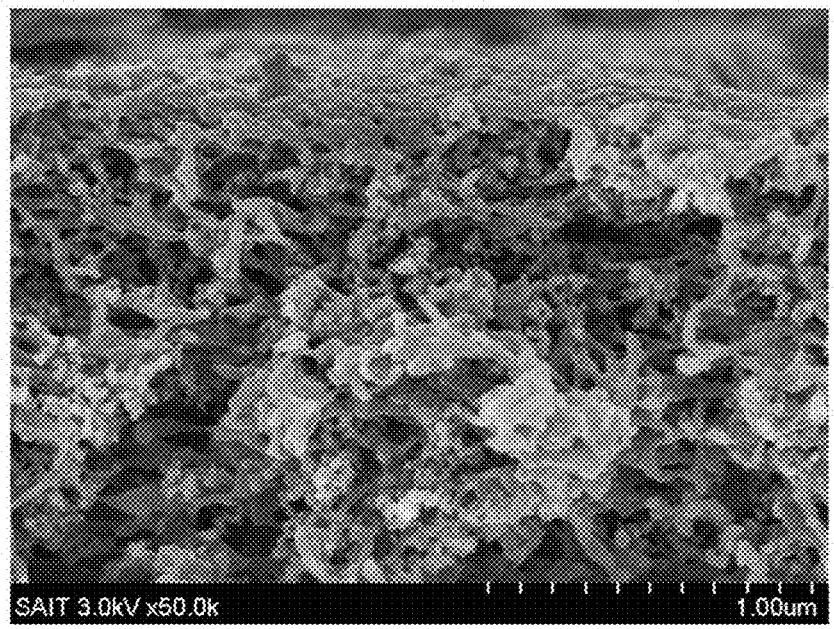
FIGS. 14 and 15 are SEM photographs showing the cross-section of a membrane according to Comparative Example 2.
Figure 15:
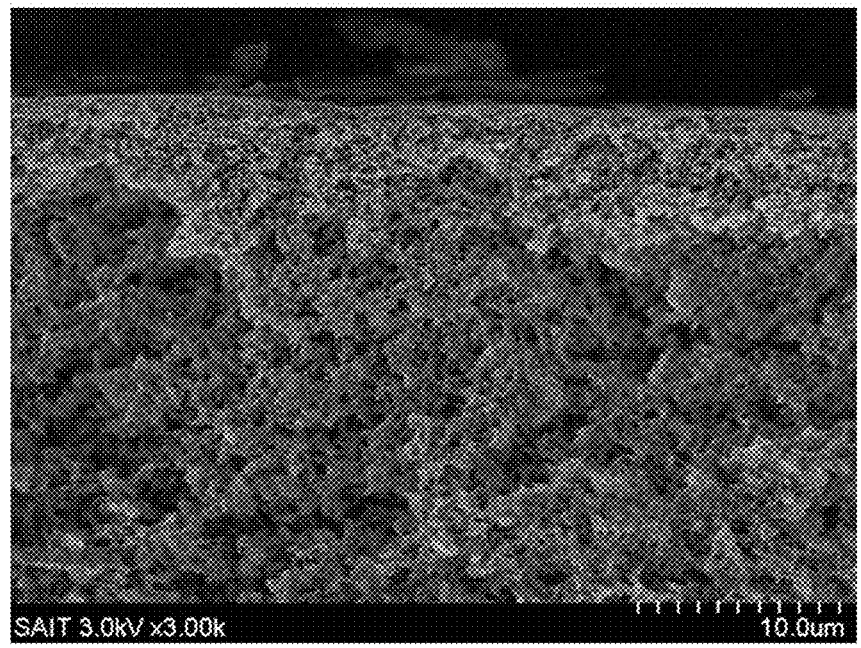
Figure 16:
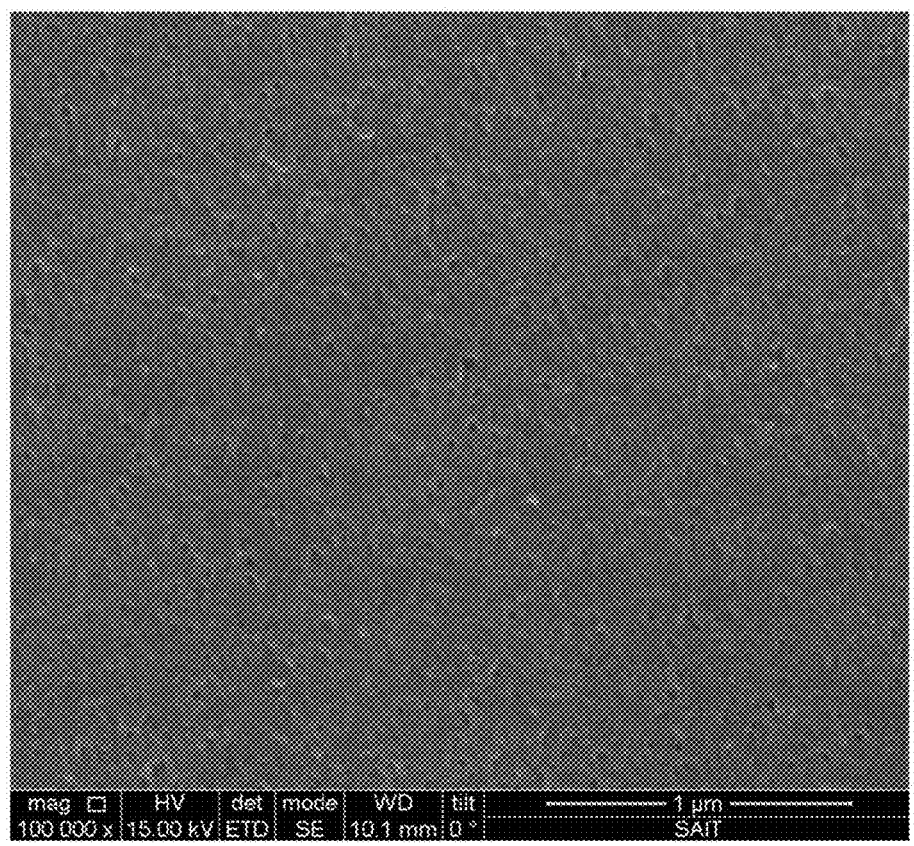
FIG. 16 is a SEM photograph showing the surface of the membrane according to Comparative Example 2.
Figure 17:
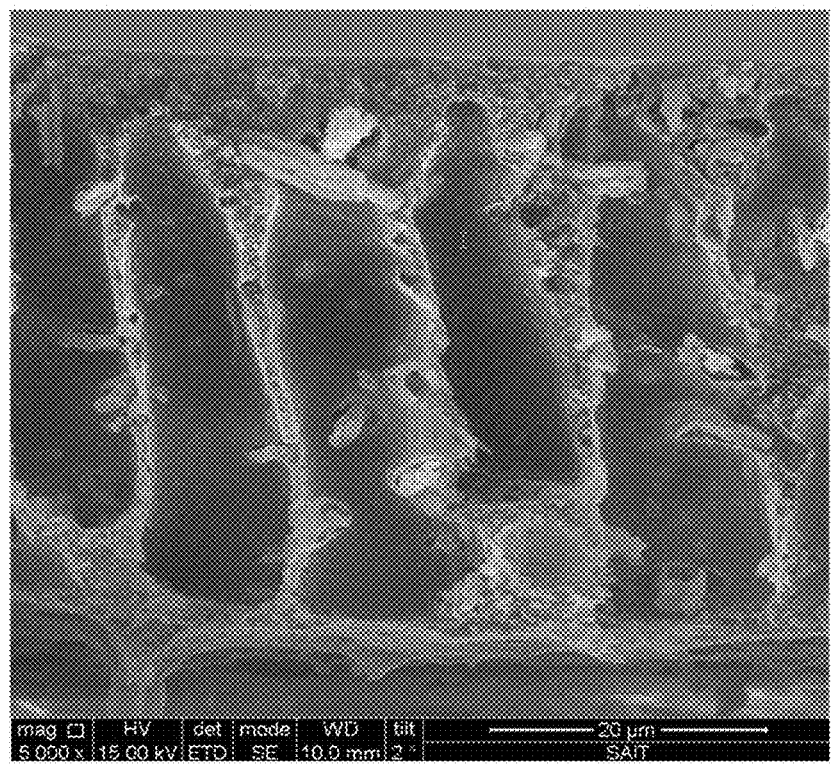
FIG. 17 is a SEM photograph showing the cross-section of a membrane according to Comparative Example 3.
Figure 18:
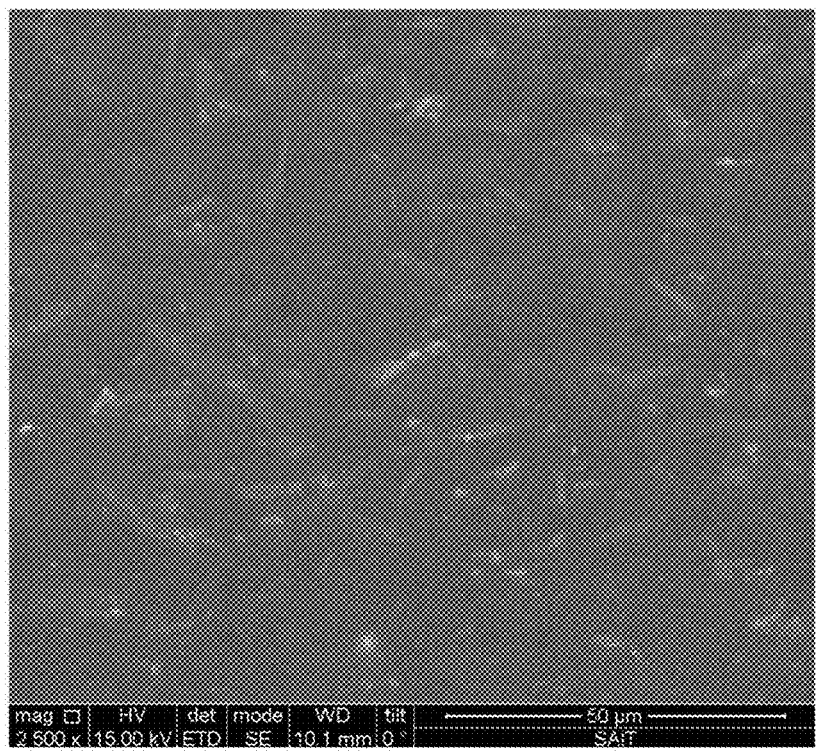
FIG. 18 is a SEM photograph showing the surface of the membrane according to Comparative Example 3.

FIGS. 10 to 12 are SEM photographs showing the cross-section of the composite membrane according to Example 2; FIG. 13 is a SEM photograph showing the cross-section of the composite membrane according to Comparative Example 1; FIGS. 14 and 15 are SEM photographs showing the cross-section of the composite membrane according to Comparative Example 2; FIG. 16 is a SEM photograph showing the surface of the composite membrane according to Comparative Example 2; FIG. 17 is a SEM photograph showing the cross-section of the composite membrane according to Comparative Example 3; and FIG. 18 is a SEM photograph showing the surface of the composite membrane according to Comparative Example 3.

In the case of the composite membrane according to Example 2, it is confirmed that the channel direction of porous inorganic particles is disposed relatively near the direction perpendicular to the membrane surface in the polymer matrix, and the porous inorganic particles are controlled to have an aspect ratio range from about 0.8 to about 2.

On the other hand, in the case of the organic/inorganic composite membranes according to Comparative Examples 1 to 3, the average length of the porous inorganic particles in the direction parallel to the channel is relatively very much higher than the average length in the direction perpendicular to the channel, and the particles are disposed in a similar level to the surface direction of the membrane in a polymer matrix.

Evaluation 2: Measurement of Pure Water Flux (PWF)

The separation membranes of Example 2, Comparative Example 1, and Comparative Example 3 are measured for pure water flux. Comparing the pure water flux (PWF), only the performance of support layer itself may be compared, with removing the influence of the active layer in the semi-permeable separation membrane.

The results are shown in the following Table 2 and FIG. 19.

TABLE 2

|  | PWF (pure water flux) | Increase rate of water permeability (%) (relative to Comparative Example 1) |
|---|---|---|
| Example 2 | 4747.66 | 47.2 |
| Comparative Example 1 | 3225.74 | — |
| Comparative Example 3 | 3743.66 | 16.1 |

Figure 19:
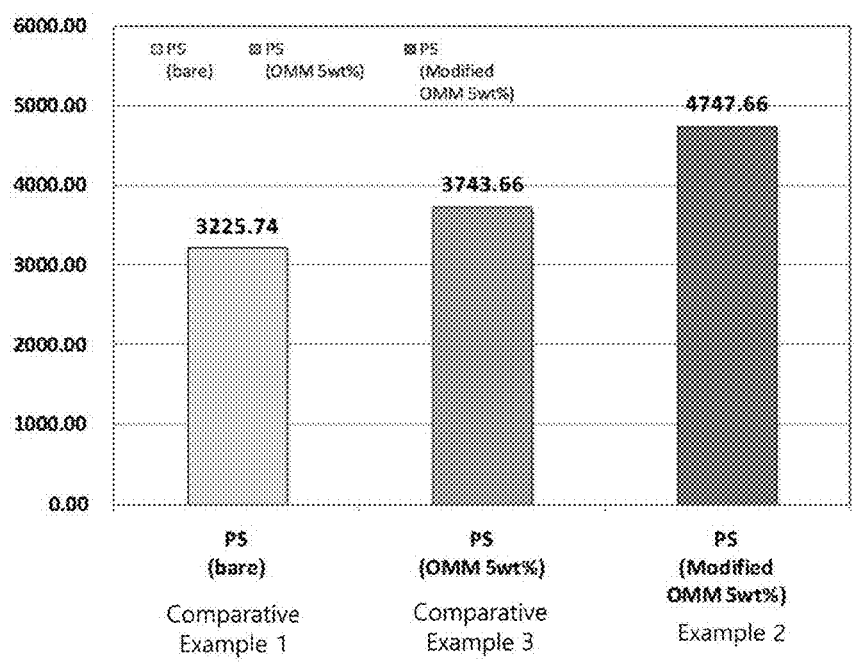
FIG. 19 is a graph showing pure flux of separation membranes according to Example 2, Comparative Example 1, and Comparative Example 3.

FIG. 19 is a graph showing pure water flux of the separation membranes according to Example 2, Comparative Example 1, and Comparative Example 3.

Referring to FIG. 19, it is confirmed that the composite membrane according to Example 2 has PWF of 4747.66 which represents significantly higher water permeability compared to the membranes according to Comparative Examples 1 and 3, and particularly, it has a water permeability improving effect reaching 47% compared to the membrane according to Comparative Example 1 including no inorganic particles.

However, referring to FIG. 19, it is confirmed that, in the composite membrane according to Comparative Example 3 which is added with the porous particles in the same amount as in Example 2, PWF is improved compared to Comparative Example 1 including no inorganic particles, but the improvement is 16.1% which is marginal.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: composite membrane
120: porous inorganic particle
Zm: channel direction
1000: semi-permeable separation membrane
110: organic polymer matrix
Ym: direction perpendicular to surface of composite membrane
200: separation layer
P: pore a: length of porous inorganic particle in direction perpendicular to channel
b: length of porous inorganic particle in direction parallel to channel

The invention claimed is:

1. A composite membrane, comprising:
an organic polymer matrix; and
a plurality of porous inorganic particles having a plurality of pores forming a channel in a first direction,
wherein, an average length of the porous inorganic particles in the first direction parallel to the channel is less than three times but more than one times an average maximum length of the porous inorganic particles in a second direction perpendicular to the channel.

2. The composite membrane of claim 1, wherein the plurality of porous inorganic particles are arranged within a range from about −45° to about 45° relative to the first direction perpendicular to a surface of the composite membrane in the organic polymer matrix.

3. The composite membrane of claim 1, wherein each of the plurality of pores of the plurality of porous inorganic particles have a pore size of about 1 nanometer to about 50 nanometers.

4. The composite membrane of claim 1, wherein the plurality of porous inorganic particles in the first direction parallel to the channel have an average length of about 50 nanometers to about 3 micrometers.

5. The composite membrane of claim 1, wherein the plurality of porous inorganic particles in the first direction parallel to the channel have an average length of about 50 nanometers to 600 nanometers.

6. The composite membrane of claim 1, wherein the plurality of porous inorganic particles are silica-containing particles.

7. The composite membrane of claim 1, wherein the plurality of porous inorganic particles include one of MCM-42, SBA-3, SBA-15, SBA-16, MCM-48, MCM-50, SBA-1, and a combination thereof.

8. The composite membrane of claim 1, wherein the organic polymer matrix includes one of polysulfone, polyethersulfone, poly(ether sulfone ketone), polyacrylonitrile, polymethacrylonitrile, polyethylene, polypropylene, polystyrene, a polycarbonate, polyethylene terephthalate, polybutylene terephthalate, a polyimide-based polymer, a polybenzimidazole-based polymer, a polybenzothiazole-based polymer, a polybenzoxazole-based polymer, a polyepoxy-based polymer, a polyphenylenevinylene-based polymer, a polyamide-based polymer, a cellulose-based polymer, polyvinylidene fluoride (PVDF), polytetrafluoroethylene (PTFE), polyvinylchloride (PVC), and a combination thereof.

9. The composite membrane of claim 1, wherein the plurality of porous inorganic particles are included in an amount of about 0.5 wt % to about 10 wt % based on a total weight of the composite membrane.

10. A semi-permeable separation membrane, comprising: the composite membrane of claim 1; and a separation layer.

11. The semi-permeable separation membrane of claim 10, wherein the separation layer includes one of a polyamide, a cross-linked polyamide, a polyamide-hydrazide, a poly(amide-imide), a polyimide, poly(allylamine)hydrochloride/poly(sodium styrene sulfonate) (PAH/PSS), a polybenzimidazole, a sulfonated poly(arylene ether sulfone), and a combination thereof.

12. The semi-permeable separation membrane of claim 10, wherein the composite membrane has a thickness of about 25 to about 250 micrometers.

13. The semi-permeable separation membrane of claim 10, wherein the separation layer has a thickness of about 0.01 to about 100 micrometers.

14. The semi-permeable separation membrane of claim 10, wherein the semi-permeable separation membrane is one of a microfiltration membrane, an ultrafiltration membrane, and a nanofiltration membrane.

15. A water treatment device comprising the semi-permeable separation membrane of claim 10.

16. The composite membrane of claim 1, wherein the plurality of porous inorganic particles are arranged within a range from about −30° to about 30° relative to the first direction perpendicular to a surface of the composite membrane in the organic polymer matrix.

17. The semi-permeable separation membrane of claim 10, wherein the separation layer is on at least one surface of the composite membrane.

18. The semi-permeable separation membrane of claim 17, wherein the plurality of porous inorganic particles are arranged within a range from about −45° to about 45° relative to the separation layer.

19. The semi-permeable separation membrane of claim 10, wherein the separation layer is configured to be an active layer for a separation property of the semi-permeable separation membrane, and the composite membrane is configured to be a support layer for supporting the separation layer.

* * * * *